United States Patent
Belisomi et al.

(10) Patent No.: US 9,706,162 B2
(45) Date of Patent: Jul. 11, 2017

(54) METHOD FOR DISPLAYING A VIDEO STREAM ACCORDING TO A CUSTOMISED FORMAT

(75) Inventors: Pietro Belisomi, Vittuone (IT); Franco Mussino, Turin (IT); Pietro Porzio Giusto, Rome (IT); Saverio Celia, Rivalta di Torino (IT)

(73) Assignee: SISVEL TECHNOLOGY S.R.L., None (TO) (IT)

( * ) Notice: Subject to any disclaimer, the term of this patent is extended or adjusted under 35 U.S.C. 154(b) by 45 days.

(21) Appl. No.: 13/639,459

(22) PCT Filed: Apr. 11, 2011

(86) PCT No.: PCT/IB2011/051547
§ 371 (c)(1),
(2), (4) Date: Oct. 4, 2012

(87) PCT Pub. No.: WO2011/128829
PCT Pub. Date: Oct. 20, 2011

(65) Prior Publication Data
US 2013/0027608 A1    Jan. 31, 2013

(30) Foreign Application Priority Data
Apr. 14, 2010 (IT) ............................... TO2010A0294

(51) Int. Cl.
*H04N 7/01* (2006.01)
(52) U.S. Cl.
CPC ............................. *H04N 7/0122* (2013.01)

(58) Field of Classification Search
USPC ................... 348/441, 445, 580, 581, 734
See application file for complete search history.

(56) References Cited

U.S. PATENT DOCUMENTS

| | | | | |
|---|---|---|---|---|
| 4,785,296 A | * | 11/1988 | Tabata et al. | 345/634 |
| 4,809,163 A | * | 2/1989 | Hirosawa et al. | 713/323 |
| 5,289,390 A | * | 2/1994 | Unverrich | 345/1.1 |
| 5,298,995 A | * | 3/1994 | Monta et al. | 348/458 |

(Continued)

FOREIGN PATENT DOCUMENTS

| | | |
|---|---|---|
| CN | 101094369 A | 12/2007 |
| CN | 101394506 A | 3/2009 |

(Continued)

OTHER PUBLICATIONS

International Search Report issued Oct. 28, 2011 in Application No. PCT/IB2011/051547, filed Apr. 11, 2011.

(Continued)

*Primary Examiner* — Brian Yenke
(74) *Attorney, Agent, or Firm* — Workman Nydegger

(57) ABSTRACT

A method for displaying a video stream according to a format defined by a user, wherein a graphic element is superimposed on the displayed video stream, and wherein the dimensions and/or position of the graphic element are modified as a function of commands received from the user, so as to define a screen area in which a certain portion of the frames of the video stream is displayed. The video stream is then displayed in a format wherein, for each frame, the frame portion defined by the graphic element is displayed with altered dimensions and/or position on the screen.

19 Claims, 7 Drawing Sheets

(56) References Cited

U.S. PATENT DOCUMENTS

| | | | | |
|---|---|---|---|---|
| 5,367,615 A * | 11/1994 | Economy et al. | ............ | 345/441 |
| 5,659,369 A * | 8/1997 | Imaiida | ............ | 348/556 |
| 5,699,123 A * | 12/1997 | Ebihara et al. | ............ | 348/445 |
| 5,748,189 A * | 5/1998 | Trueblood | ............ | 715/755 |
| 5,764,518 A * | 6/1998 | Collins | ............ | 700/95 |
| 5,805,118 A * | 9/1998 | Mishra et al. | ............ | 345/1.1 |
| 5,828,351 A * | 10/1998 | Wu | ............ | 345/11 |
| 5,835,813 A * | 11/1998 | Luong et al. | ............ | 348/445 |
| 5,912,668 A * | 6/1999 | Sciammarella et al. | ............ | 715/788 |
| 5,990,970 A * | 11/1999 | Choi | ............ | 348/556 |
| 6,046,709 A * | 4/2000 | Shelton et al. | ............ | 345/1.1 |
| 6,067,126 A * | 5/2000 | Alexander | ............ | 348/738 |
| 6,311,328 B1 * | 10/2001 | Miyazaki et al. | ............ | 725/37 |
| 6,411,302 B1 * | 6/2002 | Chiraz | ............ | 345/545 |
| 6,556,252 B1 * | 4/2003 | Kim | ............ | 348/565 |
| 6,570,546 B1 * | 5/2003 | Welker et al. | ............ | 345/1.1 |
| 6,678,009 B2 * | 1/2004 | Kahn | ............ | 348/569 |
| 6,690,425 B1 * | 2/2004 | Worrell | ............ | 348/445 |
| 6,707,504 B2 * | 3/2004 | Chung | ............ | 348/569 |
| 6,801,211 B2 * | 10/2004 | Forsline et al. | ............ | 345/581 |
| 6,847,335 B1 * | 1/2005 | Chang et al. | ............ | 345/3.1 |
| 6,961,509 B2 | 11/2005 | Ozawa et al. | | |
| 7,030,892 B1 * | 4/2006 | Gyde et al. | ............ | 345/635 |
| 7,123,248 B1 * | 10/2006 | Lafleur | ............ | 345/204 |
| 7,206,029 B2 * | 4/2007 | Cohen-Solal | ............ | 348/565 |
| 7,274,382 B2 * | 9/2007 | Plut | ............ | 345/660 |
| 7,432,983 B2 * | 10/2008 | Masukura et al. | ............ | 348/576 |
| 7,493,642 B2 * | 2/2009 | Shintani et al. | ............ | 725/44 |
| 7,710,434 B2 * | 5/2010 | Gu | ............ | 345/589 |
| 7,760,269 B2 * | 7/2010 | Ochs et al. | ............ | 348/556 |
| 7,911,408 B2 * | 3/2011 | Cho et al. | ............ | 345/2.1 |
| 7,948,448 B2 * | 5/2011 | Hutchinson et al. | ............ | 345/1.1 |
| 8,125,932 B2 * | 2/2012 | Yang | ............ | 370/260 |
| 8,144,259 B2 * | 3/2012 | Ichihashi | ............ | 348/725 |
| 8,174,627 B2 * | 5/2012 | Taft et al. | ............ | 348/746 |
| 8,191,008 B2 * | 5/2012 | Ramnani | ............ | 715/788 |
| 8,280,483 B2 * | 10/2012 | Zhu et al. | ............ | 600/407 |
| 2002/0089523 A1 * | 7/2002 | Hodgkinson | ............ | 345/660 |
| 2002/0109794 A1 * | 8/2002 | Bergman | ............ | 348/841 |
| 2003/0001908 A1 * | 1/2003 | Cohen-solal | ............ | 345/863 |
| 2003/0015632 A1 * | 1/2003 | Dunn et al. | ............ | 248/122.1 |
| 2003/0027517 A1 * | 2/2003 | Callway et al. | ............ | 455/3.01 |
| 2003/0090506 A1 * | 5/2003 | Moore et al. | ............ | 345/730 |
| 2003/0110926 A1 * | 6/2003 | Sitrick et al. | ............ | 84/477 R |
| 2003/0117408 A1 * | 6/2003 | Forsline et al. | ............ | 345/581 |
| 2003/0182418 A1 * | 9/2003 | Feldman et al. | ............ | 709/224 |
| 2003/0214585 A1 * | 11/2003 | Bakewell | ............ | 348/148 |
| 2004/0015893 A1 * | 1/2004 | Banavar et al. | ............ | 717/138 |
| 2004/0075623 A1 * | 4/2004 | Hartman | ............ | 345/1.3 |
| 2004/0088564 A1 * | 5/2004 | Norman | ............ | 713/200 |
| 2004/0246253 A1 * | 12/2004 | Mizukami | ............ | 345/441 |
| 2004/0252238 A1 | 12/2004 | Park et al. | | |
| 2005/0057435 A1 * | 3/2005 | Su | ............ | 345/1.3 |
| 2005/0094034 A1 * | 5/2005 | Bhatia et al. | ............ | 348/581 |
| 2005/0180858 A1 * | 8/2005 | Halgas | ............ | 417/53 |
| 2005/0237699 A1 * | 10/2005 | Carroll | ............ | 361/600 |
| 2006/0001650 A1 * | 1/2006 | Robbins | ............ | G06F 3/0421 345/173 |
| 2006/0007240 A1 * | 1/2006 | Herbert et al. | ............ | 345/601 |
| 2006/0238967 A1 * | 10/2006 | Carson et al. | ............ | 361/681 |
| 2006/0267857 A1 * | 11/2006 | Zhang et al. | ............ | 345/1.1 |
| 2007/0079252 A1 * | 4/2007 | Ramnani | ............ | 715/781 |
| 2007/0159553 A1 * | 7/2007 | Kondo et al. | ............ | 348/441 |
| 2007/0258012 A1 * | 11/2007 | Miller | ............ | 348/581 |
| 2007/0279315 A1 * | 12/2007 | Laves et al. | ............ | 345/1.1 |
| 2008/0008401 A1 * | 1/2008 | Zhu et al. | ............ | 382/294 |
| 2008/0016532 A1 * | 1/2008 | Wang et al. | ............ | 725/45 |
| 2008/0055201 A1 * | 3/2008 | Kajiwara | ............ | 345/60 |
| 2008/0094502 A1 * | 4/2008 | Liebhold | ............ | 348/445 |
| 2008/0165202 A1 * | 7/2008 | Brodersen et al. | ............ | 345/581 |
| 2008/0198178 A1 | 8/2008 | Julin et al. | | |
| 2009/0079687 A1 * | 3/2009 | Herz et al. | ............ | 345/100 |
| 2009/0109243 A1 * | 4/2009 | Kraft | ............ | G06F 3/0481 345/660 |
| 2010/0033505 A1 | 2/2010 | Hsieh | | |
| 2010/0257442 A1 * | 10/2010 | Kembel et al. | ............ | 715/234 |
| 2011/0102299 A1 * | 5/2011 | Hochmuth et al. | ............ | 345/1.2 |

FOREIGN PATENT DOCUMENTS

| | | |
|---|---|---|
| CN | 101442634 A | 5/2009 |
| EP | 0685139 | 12/1995 |
| JP | 2005-227476 | 8/2005 |
| TW | I296176 | 4/2008 |
| TW | 200930096 A | 7/2009 |
| WO | WO 2008/125897 A2 | 10/2008 |

OTHER PUBLICATIONS

Written Opinion issued Oct. 28, 2011 in Application No. PCT/IB2011/051547, filed Apr. 11, 2011.

Chinese Office Action dated Aug. 23, 2013, issued in Chinese Application No. 1000112144.

* cited by examiner

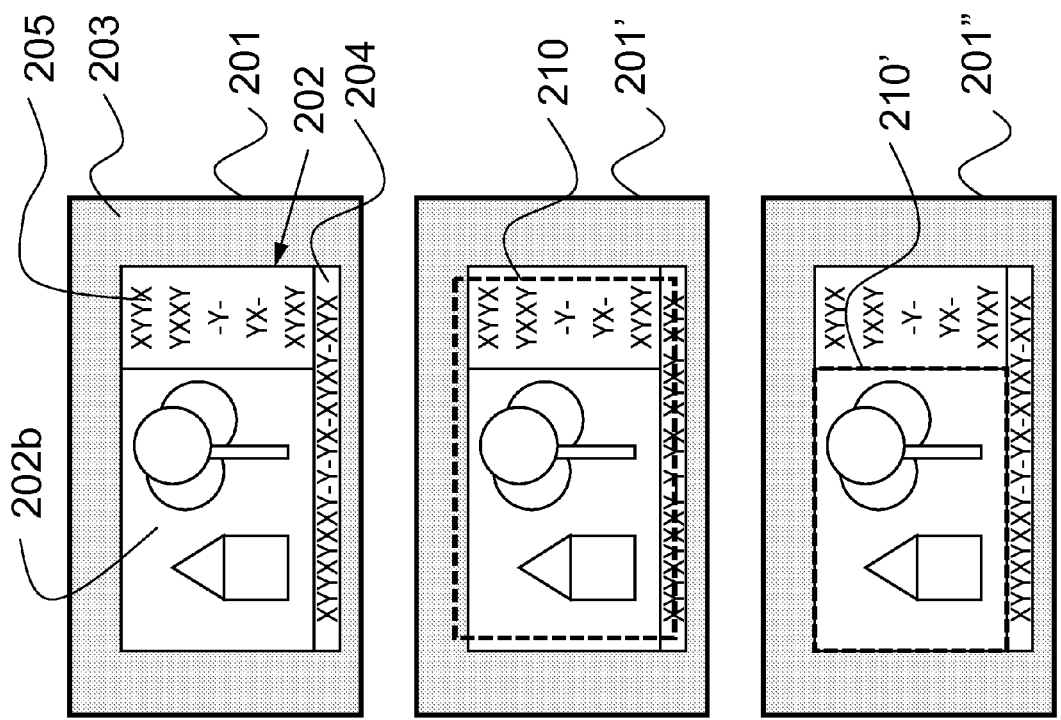

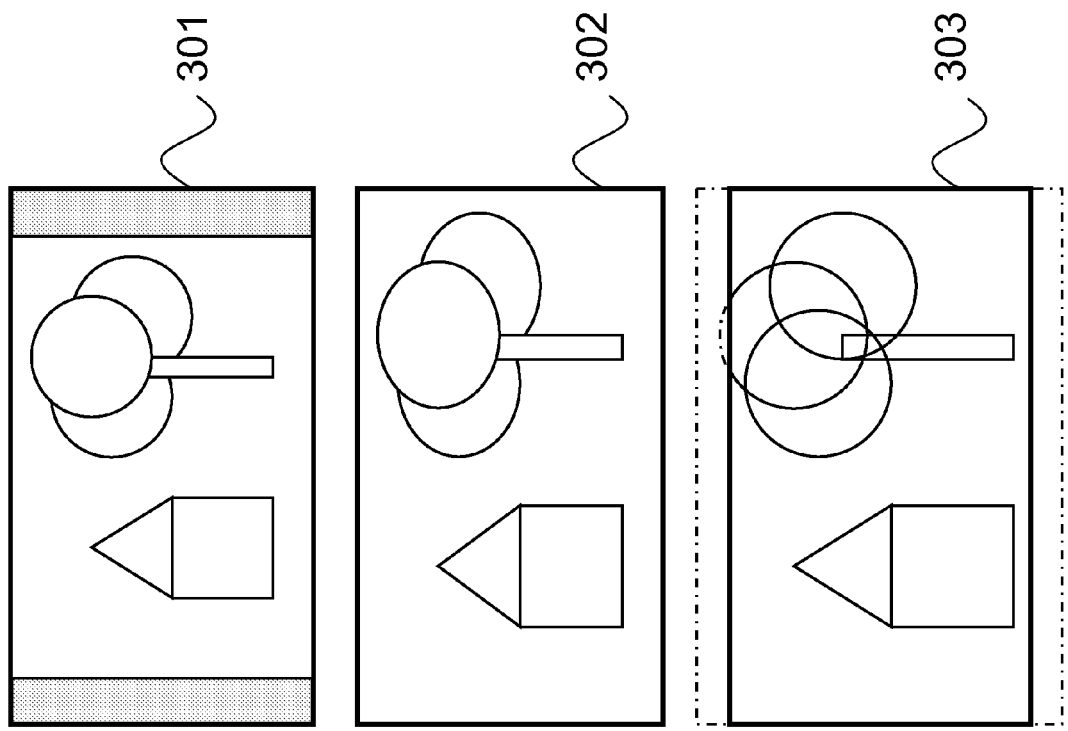

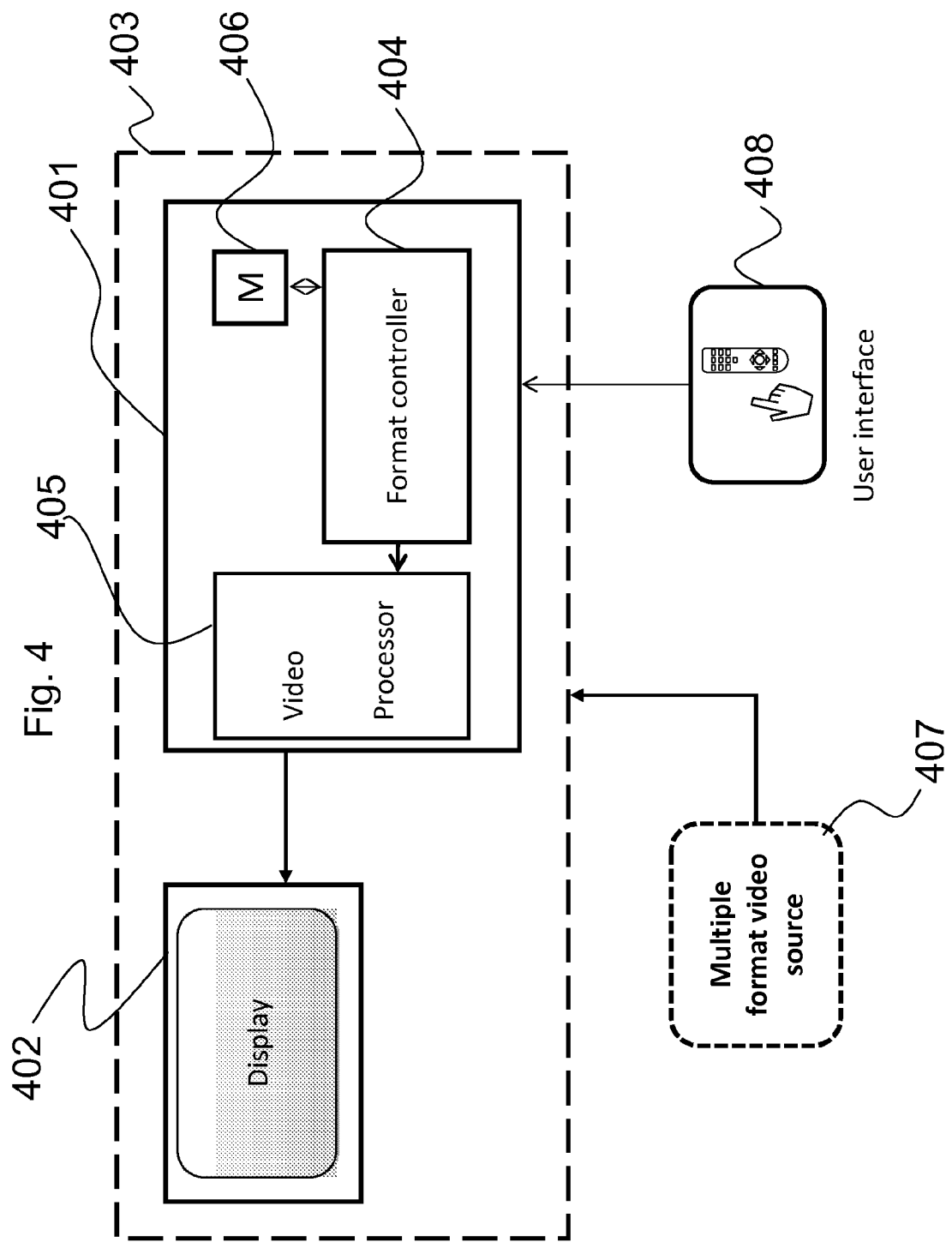

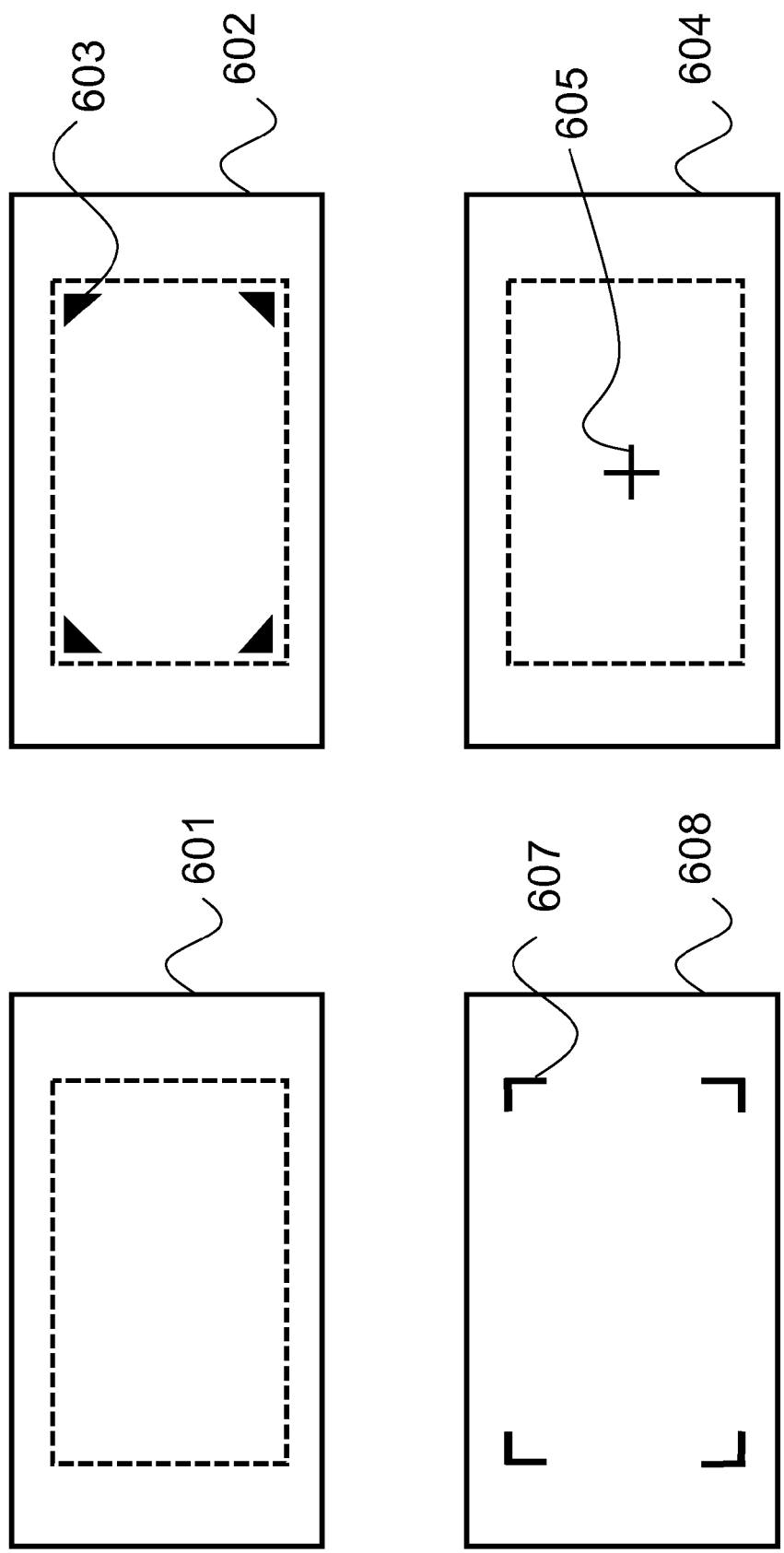

METHOD FOR DISPLAYING A VIDEO STREAM ACCORDING TO A CUSTOMISED FORMAT

BACKGROUND OF THE INVENTION

Technical Field

The present invention relates to a method for displaying a video stream, and in particular to a method for allowing a user to define a customised display format which can be recalled manually by the user or automatically by the device displaying the video stream.

Prior Art

In developed countries, television sets, monitors and other types of video screens have now undergone the transition from the 4:3 aspect ratio to the "Widescreen" 16:9 aspect ratio for video stream display.

The term "aspect ratio" refers to the mathematical ratio between frame width and frame height in a video stream.

Although most latest-generation displays have been optimised for 16:9 video contents, there are still television programs with different original aspect ratios, even within the same broadcast. This requires that the most appropriate display format be selected in order to make the program more pleasant for the spectator. For example, sometimes one television broadcaster broadcasts programs in the 4:3 format and other programs in the 16:9 format, depending on their native (i.e. recording) format. Other times, broadcasters frame the image of the original video stream (e.g. a film recorded in any one of the various aspect ratios, such as 2.35:1, 1.85:1 or 1.78:1) by adding black-background bands (called mattes) above and under the original image.

These mattes (which may be arranged on one or more sides to frame the original image) are often used for advertising or information purposes by television broadcasters, who enter into them texts, images, logos or other accessory contents, whether or not related to the content of the original video stream and often representing a sort of frame for the main image.

These bands, especially when they contain advertisements or other auxiliary dynamic contents, occupy a large portion of the space available on the television screen, and may therefore be annoying for the spectator, who is generally more interested in the image comprised in between these bands.

In order to adapt the visualisation of video contents to the screen size, devices are known at present which can recognise the format of the video stream being broadcast based on information contained in the television signal (e.g. in "Wide Screen Signaling" (WSS) for analog broadcasting or in the tables of the "transport stream" or in the "sequence header" for digital broadcasting), so that they can adapt the display mode to the screen size.

However, these devices are only effective for areas containing no visual information, and cannot take into account any bands introduced at video production level. Furthermore, their operation is heavily dependent on the accuracy of the information about the format of the video stream contained in the video signal itself; if such information is incorrect or is not updated by the television broadcaster, the device will not operate correctly.

Devices are also known which allow the display mode of the video stream (broadcast by a television broadcaster or played from a storage medium) to be manually adjusted in accordance with factory settings predefined by the device manufacturer. The user will select a display format among the predefined formats available in the device (for example: "4:3", "16:9", "Widescreen", "Central zoom", "Cinema", etc.), and then the device will execute image resizing, cutting or deformation operations on the received video stream according to the option chosen by the user.

However, since spectators have different tastes, the resizing options set at the factory cannot cover the preferences of all users. In order to meet this requirement, the Samsung LE 40A856S1M television set allows to select a user-defined "customised" display mode called "ZOOM" by means of a special configuration procedure, which is however time-consuming, complex and not very intuitive. In order to define the display mode, in fact, the user must interact several times with the television set by moving and expanding the image without having a complete vision of the full image.

Finally, there are automatic resizing methods wherein the device directly analyses the active content of the video stream and autonomously changes the display mode on the basis of such content, thereby resizing it; a device of this type is known, for example, from patent EP0685139.

However, the results obtained from these methods are not always satisfactory for the user: the algorithm for automatically detecting the active areas of the video stream cannot correctly detect and identify any areas containing information of interest for the user, since it is exclusively based on the luminance threshold of the pixels of each frame of the video stream. Since the frames of the video stream may vary considerably their content instant by instant (e.g. during advertising breaks or if the displayed program is changed), the device may execute an annoying and disturbing series of useless successive resizing operations which will ruin the visual experience.

OBJECTS AND BRIEF DESCRIPTION OF THE INVENTION

It is one object of the present invention to solve some of the problems suffered by the prior art in the field of the methods for displaying video streams.

In particular, the present invention aims at improving the fruition of video contents by a user.

It is another object of the present invention to provide a method which allows the user to define a video stream display format in an intuitive and effective manner.

It is a further object of the present invention to improve the switching, whether automatic or not, between the different display formats.

These and other objects of the present invention are achieved through a method and a device for changing the display format of a video stream incorporating the features set out in the appended claims, which are intended as an integral part of the present description.

The general idea at the basis of the present invention is to allow a user to define a video stream display format through a graphic element which is superimposed on the video stream being displayed according to a first format defined by the broadcaster or automatically selected by the television set. The user modifies the shape and/or position of the graphic element so as to define a screen area in which a certain portion of the frames of the video stream is displayed (in the first format), e.g. the pixels of rows 30 to 400 and of columns 5 to 500. Once the frame portion of interest has been defined, the video stream is displayed in a second format in which for each frame the selected portion is displayed in expanded form (or, more in general, with altered dimensions and/or position) on the screen, thus very effectively and accurately eliminating the undesired parts from the visible area of the screen.

This solution overcomes some drawbacks of the prior art; first of all, the use of a graphic element superimposed on the video stream allows the user to define in a simple and intuitive way the display format which best suits his/her needs, regardless of the factory settings.

Preferably, the graphic element superimposed on the video stream is a rectangle, the dimensions and global position of which in the frame can be modified by the user by means of specific commands. Using a rectangle allows the user to get an intuitive idea of the video portion which will be resized at the end of the display format definition procedure.

In one embodiment, the method provides for storing the settings concerning the display formats programmed by the user, so that the latter can recall, delete or modify previously stored formats. This simplifies the definition of new formats, since the user may have available a known format already redefined and stored in the past.

In one embodiment, the settings of the stored display formats comprise information associated with the content of the original video stream, such as format, television broadcaster, television program name, etc. This advantageously allows the stored display formats to be automatically recalled, and also allows the user to mnemonically associate the format with a given event.

BRIEF DESCRIPTION OF THE DRAWINGS

Further objects and advantages of the present invention will become more apparent from the following detailed description and from the annexed drawings, which are supplied by way of non-limiting example, wherein:

FIG. 2 shows an example of a mode of selecting the portion of interest of the video stream frame.

FIG. 3*a* shows three modes of a first type of procedure for resizing the video stream frame.

FIG. 4 shows an example of a device implementing the method according to the present invention.

FIG. 6 shows three embodiments of graphic elements superimposed on the screen according to the present invention.

DETAILED DESCRIPTION OF THE PREFERRED EMBODIMENTS

Figure 1:
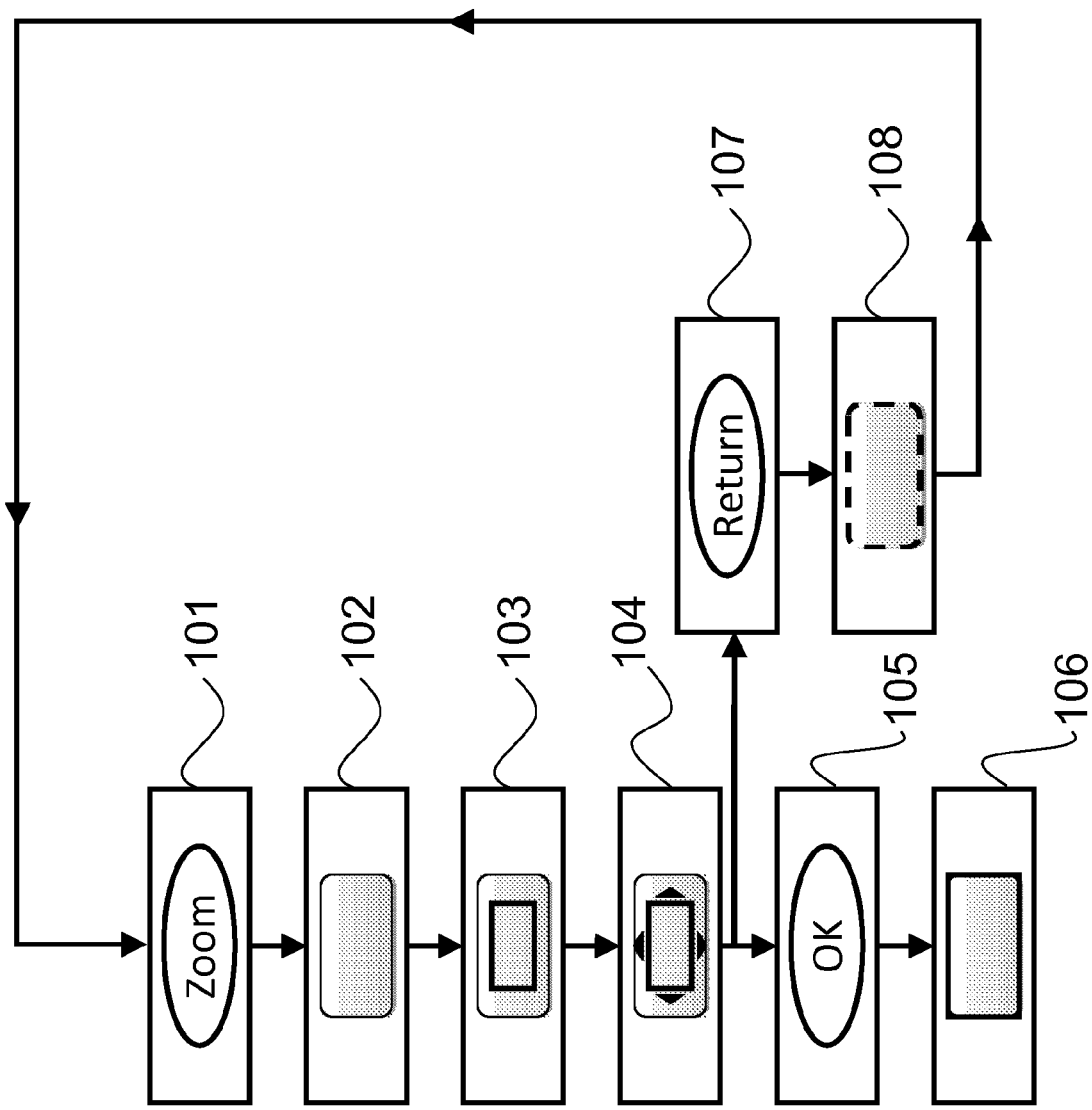
FIG. 1 shows a flow chart exemplifying the method for displaying a video stream according to the present invention.

The example of FIG. 1 shows a flow chart relating to an embodiment of a method for displaying a video stream according to the present invention. In this example the method will be described with reference to a television set, but it is clear that such a method may be implemented in any display system, e.g. a system including a set-top-box and a display, a video recorder, a video projector, etc.

When the user watching the video content is not satisfied with the current video stream display format, he/she can decide to change it as follows.

The user recalls a specific display format definition procedure and inputs his/her intention, e.g. by pressing a button on the remote control of the device (step 101).

At this point, the television set screen will be displaying the video content according to a first format (step 102), which represents the initial condition to be changed into the new format desired by the user. The first display format may be the one currently adopted when the user starts the procedure for defining the new display format, or it may be a predefined format automatically selected by the television set, such as, for example, the original format of the video stream not subjected to any resizing operation. In the present description, the term "original format" refers to the format in which the video stream has been received by a TV receiver or read by a video player (e.g. DVD or Blu-ray) or acquired by another source (e.g. a file stored in a flash memory or downloaded from the Internet). In this case, the video stream may be displayed with black bands near the edges of the video image, due to differences between the screen size and the video stream format. The first format is preferably such that it allows the entire content of a frame to be displayed within the television set screen.

A special graphic element is then displayed on the screen (step 103), which allows to select an area of the screen within which corresponding portions of the frames making up the video stream are displayed, e.g. a particular group of pixels, such as the pixels of rows 30 to 400 and of columns 5 to 500 of each frame. These frame portions will be the ones which will be displayed when the user chooses to display the video stream according to the new format. This graphic element may, for example, be a rectangle. In order to prevent the user from being disturbed by the motion present in the video stream being displayed and to make the display system less complex, it is advantageously conceivable that the display device freezes a frame of said video stream for the whole duration of the new format selection operation. At the end of the display format definition procedure, the video stream selection carried out by the user will resume motion to be enjoyed by the user.

The user modifies the shape and/or position of the graphic element (step 104), e.g. by translating the sides of the rectangle by acting upon special remote control buttons. The user thus interactively defines that portion of the frame currently being displayed which he/she wishes to select and keep for display.

As feedback to the changes made to the shape and/or position of the graphic elements, e.g. to the commands for translating the sides of the rectangle, which change the size thereof, in one embodiment the screen indicates the user's selection dynamically.

Preferably, the graphic element used for defining the area of the video stream to be displayed in the new display format is superimposed on the images flowing as the video stream is being played, thus allowing the user to change his/her selection depending on the scenes being reproduced. The superimposition of the graphic element may be obtained either in half-transparency (i.e. by letting the content of the underlying pixels show through) or in opaqueness (i.e. by concealing the content of the underlying pixels). The user has to confirm the frame portion of interest selected and defined by the graphic elements (step 105), e.g. by pressing a specific confirmation button or by leaving the shape and/or position of the graphic element unchanged for some time, e.g. for longer than 15 seconds.

Subsequently, the frame portion selected by the user is displayed on the screen (step 106) expanded in such a way as to occupy a preponderant screen area, as will be described below in more detail. Therefore, the display format definition procedure comprises a step of selecting the frame portion of interest and a step of resizing the selected portion on the screen.

In one embodiment, it is conceivable that the user can decide to interrupt the selection procedure at any time, e.g. because he/she does not want to complete the resize process. When such an intention is signalled by the user (step 107), the display format definition procedure is aborted, possibly subject to a second confirmation. Following the interruption, the video stream will be displayed on the screen according to a third format (step 108), e.g. a predefined format or the format used prior to the start of the display format definition procedure, and the device can, for example, return to its initial state 101 waiting for the button to be pressed.

FIG. 2 shows an example of a mode of selection of the portion of interest of the frame of the video stream.

The frame 201 represents a video stream displayed according to a predefined format (with reference to step 102 of FIG. 1), e.g. the original format. When the frame is displayed in the original format, an active portion 202 thereof is visible, which is surrounded by an empty portion 203, e.g. caused by letterbox bands or by the presence of side bands. Nevertheless, the following considerations will also apply to the case wherein the portion 203 is absent and the active portion 202 occupies the whole frame 201, which may coincide with the overall video screen. The active portion 202, in turn, includes a portion of interest 202b containing the video information of a landscape, a lower portion 204 occupied by written information flowing on the screen, in which the user is not interested, e.g. latest news, and a side portion 205 occupied by fixed written information in which the user is also not interested, e.g. current weather conditions; all this written information has been entered by the video stream producer.

The frame 201' represents the frame 201 displayed on the screen with a superimposed graphic element rectangular in shape (with reference to step 103 of FIG. 1). At the beginning, the apparatus displays this selection rectangle 210 with dimensions and position predefined by the device manufacturer or set beforehand by the user. In this example, the selection rectangle 210 has a 16:9 aspect ratio and occupies the frame portion which is usually active in 4:3 letterbox transmissions, being positioned at the centre of the screen. Alternatively, the rectangle may include the entire frame or a frame portion estimated according to a suitable algorithm based, for example, on pixel luminance, in accordance with per se known methods.

By acting upon the special interface controls, e.g. remote control buttons, the user modifies the dimensions of the rectangle to obtain the format 210' displayed in the frame 201" (with reference to step 104 of FIG. 1). The user changes the dimensions and position of the rectangle 210' in a manner such as to include therein the frame portion of the video stream in which he/she is interested, and then confirms the selection (with reference to step 105 of FIG. 1).

Preferably, it is conceivable that it is possible to adjust the shift of the sides of the rectangle 210 obtained each time a certain arrow button is pressed, thereby advantageously reducing the number of individual operations required for selecting a certain frame portion. For example, it may be provided that when a button for shifting a side or the centre of gravity of the rectangle 210 is held pressed or is pressed multiple times in succession, the number of pixels by which the rectangle is expanded and translated is progressively "accelerated".

Moreover, it is preferably conceivable that the first predefined format of the frame 201 of the video stream, coming from the TV broadcaster or from any other video source being played (with reference to step 102 of FIG. 1), is such that the whole content of the original frame of the video stream is displayed on the screen, preferably without altering the proportions of the original format, whether 4:3 or 16:9; such proportions may be obtained from information carried by the video stream or received from the user. Whenever necessary, any automatic or manual format changes previously active can be deactivated. This advantageously allows the user to display the original format of the video stream and to evaluate whether the previously used display format caused any deformations or cuts in the content of interest.

After the user has confirmed the selection of the frame portion of interest of the video stream, e.g. by pressing a button, he/she can appreciate the result of the selection of the resized video stream format. In order to meet the user's preferences at best, different modes may be conceived for managing the video stream display format depending on the frame portion selected by the user.

The example of FIG. 3a shows three possible modes in which the video stream may be displayed at the end of a first display format definition procedure.

According to this first embodiment of the invention, the user can have at least one dimension of the selected portion of the video stream frame match either one of the two dimensions of the video screen, in that he/she is prevalently interested in displaying the selected portion.

In such a case, for example, it is conceivable that the user's selection, i.e. the frame portion inside the rectangle 210' of FIG. 2, is expanded to occupy a greater screen portion than before, as shown in FIG. 3a, according to three exemplifying expansion modes:

i. Keeping the proportions of the frame with no cuts, as shown in the frame 301, i.e. by enlarging the selected portion evenly in the horizontal and vertical directions until one dimension of the selected portion matches either one of the two dimensions of the screen, with no deformation and no further cuts of the selected video content; of course, in this mode it is possible that there is no active video stream content in some screen areas, which will therefore remain "black". In the example of the frame 301, black bands appear at the sides; however, if the selection of interest of the frame were different, black bands might appear above and under the active frame portion.

ii. Filling the entire area of the screen without making any cuts to the selection, as shown in the frame 302, i.e. deforming the user's selection by having both dimensions match the dimensions of the screen, thus enlarging the selected frame up to the screen edges without cutting the selected video content; of course, in this mode the aspect ratio of the pixels will be modified with respect to the original format, and no "black" areas will appear.

iii. Keeping the proportions by centering the selection at the centre of the screen until the whole screen is filled with at least a part of the selected video content, like the frame 303 of FIG. 3a, i.e. by resizing the selection without deforming it neither horizontally nor vertically, until just one dimension of the selected area matches one dimension of the screen, whereas the other dimension may be greater than or equal to the other dimension of the screen. In this mode, the peripheral areas (which in this case are the upper and lower areas of the selection, but may be the side areas as well) are cut outside the screen in a symmetrical way; of course, there will be no black areas and the frame will suffer no deformation compared to the original proportions, but the information contained in those areas of the video stream which are cut outside the screen will be lost. In this expansion mode, it is advantageous to provide that the expansion of the selected frame portion takes place in a manner such as to minimise the area cut outside the screen, i.e. by executing the least enlargement necessary for matching either one dimension of the selected area with that of the screen.

Of course, the three expansion modes described above are merely exemplificative, and other alternative modes may be implemented without departing from the scope of the invention.

As in the previous examples, it also conceivable that the selection is automatically centered on the screen, so as to optimise the representation thereof at the end of the expansion process.

One or more expansion modes may be defined in advance at the factory and then used by the user. The expansion mode may be set once for all in a specific preferences menu, or it may be defined from time to time by the user, preferably between confirming the frame selection and resizing the selection. If the expansion mode has to be defined every time, written information or indications may be superimposed on the screen in order to allow the user to choose among various possible expansion modes, e.g. also by means of miniature preview boxes simultaneously showing on the screen the final results of the different expansion modes.

The user may also be allowed, in particular in the third mode described (with reference to the frame 303 of FIG. 3a), to change the position on the screen of the resized selection to be displayed, should the peripheral areas cut outside the screen contain interesting information which would not otherwise be visible. In such a case, by acting upon suitable items of the control unit, the user can further translate the displayed selection in all four directions (up, down, right, left) in order to move back into the screen cut areas which would otherwise remain outside the screen, while leaving out other portions of less interest (for example, subtitles for hearing impaired). The movements can therefore be obtained by translating the selection shown on the screen as a consequence of the move commands entered. As already explained in regard to the step of selecting the frame portion of interest, in this case as well the procedure can be facilitated by providing the possibility of dynamically changing the extent of the movement of the selection to be displayed.

If the user does not confirm the selection, the screen will return to the initial display mode or to a predefined format, as described with reference to steps 107 and 108 of FIG. 1.

In a second embodiment of the invention (FIG. 3b), the user may want to reposition the frame portion selected on the screen by changing the dimensions or aspect ratio thereof as desired.

This repositioning may be useful, for example, when the display device can display in dedicated areas of the screen video contents (images or video streams) coming from sources other than the one broadcasting the video stream portion selected by the user. For instance, there may be boxes generated by so-called PIP ("Picture in Picture") or PAP ("Picture And Picture") systems, wherein different video streams can be displayed simultaneously on the screen, such as television programs from different broadcasters, teletext pages of the same tuned broadcaster, films coming from multimedia readers or stored in electronic solid-state memories, etc.

In recent times the possibility has been introduced of also displaying visual information coming from Internet sites (e.g. news, weather forecasts, exchange quotations, etc.), called "widgets", which occupy a limited, and usually peripheral, portion of the screen. According to the invention, the user can redefine at will the area occupied by the selected frame portion at the end of the resize process, in order to free an area of the video screen for displaying widgets and avoiding unaesthetic overlaps.

Such a redefinition may be carried out, for example, as follows. The user expresses the intention of executing the redefinition operation by pressing a corresponding button of the control unit (501). At this point, the device display the frame portion (210') selected during the preceding selection step, in which the graphic element previously superimposed may still be visible. Then the user can redefine the area of the screen occupied by said selected portion, e.g. by changing the length of the sides of the selected frame portion or by enlarging said selection symmetrically in both the horizontal and vertical directions by dragging one vertex of the area outwards or inwards. The dimensional change or the dragging operation may take place through an auxiliary graphic element, such as an arrow or a cursor, or by graphically altering (change in colour or thickness, flashing, etc.) the graphic element already present on the screen so as to indicate the operation that can be executed.

Figure 3B:
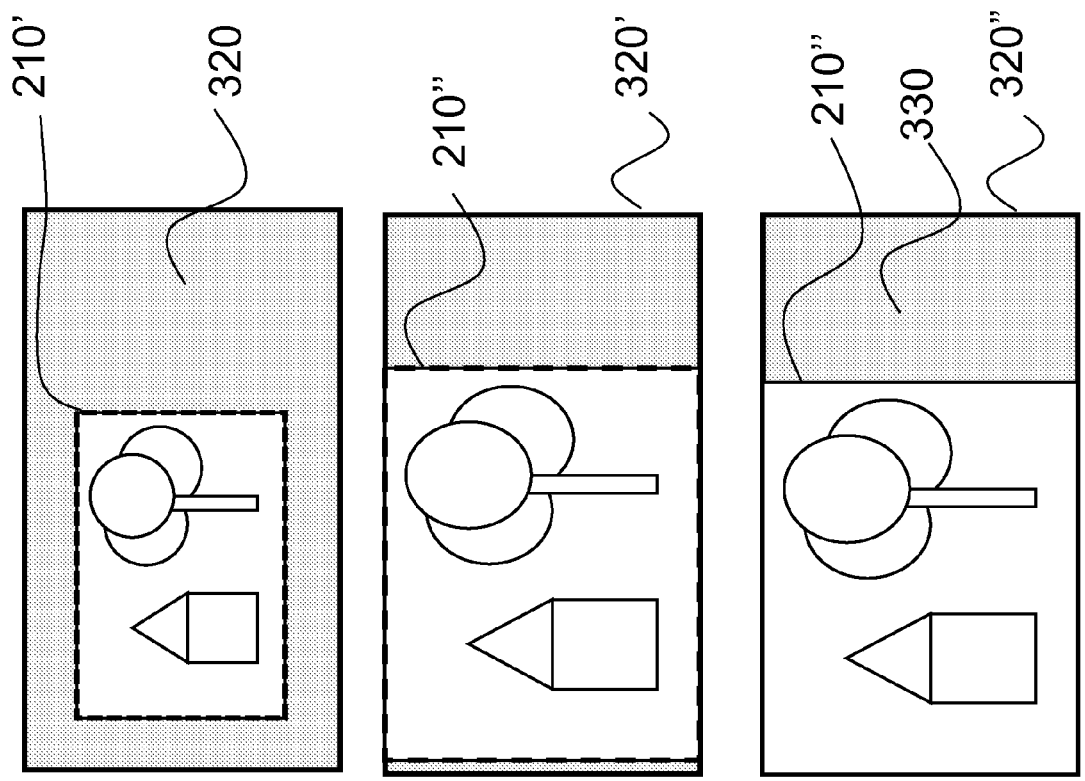
FIG. 3*b* shows three steps of a second type of procedure for resizing the video stream frame.

At each input from the user, the buttons to be pressed in order to execute the desired adjustment may vary in an interactive and contextual manner. For example, by pressing a certain button the user can select the entire area previously selected (e.g. with the "OK" button) and then move it as a whole horizontally, vertically o diagonally, depending on the buttons pressed on the remote control, without altering its dimensions. In FIG. 3b, for example, the user has expanded symmetrically the selection of the frame 210' previously selected until the height of the frame selection (designated by reference numeral 210" in the drawing) matches the dimensions of the frame 320', which may, for example, represent the dimensions of the screen available for the video stream. Subsequently, the user has translated the frame selection 210" as shown in the frame 320", i.e. by superimposing the left side of the selected frame 210" on the left side of the frame 320". This leaves a free frame portion 330, in which it is possible to place other video contents, such as PIP or PAP images, widgets and so on.

When a specific confirmation button (which may be the same "OK" button) is pressed, the position and dimensions of the frame selection is finalised on the screen. Following the actuation of the OK button, the graphic element can be removed because it is no longer necessary, thus confirming that the resize settings have been acquired and saved by the device.

In this second embodiment of the invention, measures can also be taken, as already described with reference to the first embodiment, to make it easier for the user to define the area to be selected, such as the possibility of varying the extent of movement of the selected area by operating the control unit in a way similar to that described in regard to the display area selection step.

When the selected area has been resized and the display settings have been defined, the user can either issue a final confirmation by pressing a confirmation button or abort the procedure by pressing an exit button. The user may then select either one of the two possible modes for displaying the selected frame on the screen as previously described (i.e.: expanding and matching at least one dimension, or customised redefinition of position and dimensions) at the end of the display frame selection step. To this end, the device interface may ask the user to choose which option must be executed, by means of command instructions displayed on the associated or built-in video display device.

Of course, the procedure for selecting the frame to be resized previously described may also be implemented through user interfaces other than a remote control keypad, such as, for example, a touch interface provided on a touch screen. Thanks to this interface, the user can enter commands and adjustment parameters by touching specific points or areas of the screen typically housing predetermined buttons and graphic symbols. The user interface may also consist of an acquisition device that interprets the user's gestures through a video camera framing him/her, and so on.

So far, the present description has illustrated the resizing method for defining the display format of a video stream (and then displaying it in that format) by means of interactively selecting a video portion of interest to be displayed.

One example of a device implementing the method according to the present invention is shown in FIG. 4. Such a device comprises a video signal processing unit 401 connected to a display 402. In the example of FIG. 4, the processing unit 401 and the display 402 are integrated into a single video display device 403. The video signal processing unit comprises a display format controller 404, a video processor 405 and a memory 406.

The video processing unit 401 can, based on known techniques, receive input video signals from a video source 407 that generates several original formats, and can generate a video stream that can be played on the display 402. The user can control the device through the user interface 408.

The video source 407 may consist, for example, of any device among the following: a DVD or Blu-ray player, a DVD or hard-disk video recorder, an electronic or USB memory, a set top box capable of receiving digital television signals (e.g. DVB or ATSC) and connected externally to a connection port (e.g. by means of a wired connection using an HDMI, display, DVI, RGB or SCART port or by means of a Wi-Fi or wireless connection). It may also be a tuner or reception module for analog television (e.g. PAL, SECAM or NTSC) or a digital television reception unit (e.g. DVB or ATSC) built in the very same display device 403, or any of the aforementioned devices directly built in the display device 403 instead of being connected thereto via an external connection.

When executing the method described with reference to FIG. 1, the user acts upon the interface 408 to control the processing unit 401, while the screen displays the video stream and the graphic element that allows the user to select the video portion to be displayed in the new format.

Once the user has defined the display format as previously described, the format controller 404 saves the current settings into the memory 406, so that they can be recalled later. The settings may be stored in a volatile or non-volatile manner, i.e. resistant to an interruption of the device's power supply. This latter embodiment is to be preferred in that the user will not have to repeat the customised format definition procedure in the event of a power failure.

The saved current settings may include the dimensions and position of the frame portion selected by the user, the preferred expansion or resize mode, as well as other parameters which may be used for recalling the settings. This recall procedure, whether manual or automatic, allows to take into account the context in which the selection has been made, and will be described below.

It should be noted that any bands and other uninteresting elements of the content of the original video stream typically depend on the video stream producer, on the television program broadcaster, on the particular program being broadcast, and on the content or typology of the program (e.g.: old black and white movie, sports or news program).

It is therefore likely that the user, for programs of a similar type, will want to use resize settings already used in the past, i.e. "preferred" by the user.

A first mode of recalling the resize settings may be of the manual type. In one embodiment it is possible to create a list of settings of preferred display formats, saving them under a particular name possibly chosen by the user, for example, and entered through the user interface 408 according to known techniques. For instance, the customised display setting programmed by the user may be added at the end of the list of the factory settings and of any customised settings already stored. It is also conceivable that the user can re-determine the list order, so that any settings considered to be more important or more frequently used can be selected more quickly. It is also conceivable that those items which have become obsolete or are seldom used can be deleted from the list. Deletion may be allowed, for example, only for customised settings or for all settings; it may also require entering a password in order to prevent any undesired or unauthorised removal.

The settings in the list may be recalled through a specific button which cyclically browses each setting. More advantageously, a drop-down list may be displayed in (transparent or opaque) superimposition on the screen, which contains references to the formats (whether customized or not) stored in the memory, with a pointer or another mark on the currently active format; by acting upon the control unit, the user can select the display setting to be activated for the video stream being played and then confirm his/her selection through a specific command. If the display settings exceed those that can be appropriately display on one screen, it may be possible to select the other available settings on drop-down lists displayed in sequence on several screens.

As an alternative or in addition, the display setting may be selected from a specific option in the interactive control menu of the apparatus. By using the control unit, the user gains access to a page or sub-menu in which he/she selects the resize setting to be used.

It is also conceivable to store a frozen frame of the video stream being displayed on the screen when the selection is made, comprising the superimposed graphic element, or a miniature representation thereof, so that it can be easily recognised by the user at a later time.

A second mode of recalling the display settings may be of the automatic type. In this case, once the user has confirmed the preferred display format as described with reference to step 105 of FIG. 1, the format controller 404 stores the dimensions and position of the user's selection in addition to other parameters which can be used for recalling the settings, which may include, for example, one or more of the following:

original format of the video stream;
content of the video stream or parts thereof;
active program number of the TV receiver;
video input from which the displayed video content originates (SCART, HDMI1, HDMI2, USB, Component, etc.);
title of the DVD or Blu-ray or name of the file being played;
name or identifier of the television broadcaster;
title of the TV program and/or type thereof (sports, news, weather forecasts);
TV program broadcasting date and time.

The stored parameters may vary depending on the source of the video content being displayed on the screen (TV tuner, external video input, storage medium) and on their availability in the video content. For example, in the case of digital television broadcasting the broadcaster usually includes in the television signal the title of the program being broadcast by means of the fields of the metadata tables specifically provided by the DVB (Digital Video Broadcasting) standard, as well as a brief description (e.g. in the short_event_descriptor or extended_event_descriptor fields) and the event type (in the content_descriptor_field); this information can be acquired and stored together with the information about the resize setting which was active when that program was being displayed on the screen. The process is similar, though less detailed, in the case of analog broadcasting, where it is possible to store the program number or the station name or identifier, when transmitted by the broadcaster; similar information may also be acquired through teletext or through the VPS signal of analog transmissions. Also, the mode of acquisition of a certain parameter may change depending on the type of signal received: for example, the original format of the video stream may be acquired from the WSS (Wide Screen Signalling) signal defined by the technical standard ETSI 300 294 for analog transmissions or from the specific data field of a table of the transport stream for digital transmissions, as provided for by the ISO/IEC 11172-2 standard (Part 2: Video, par. 2.4.3 "Semantics for the video bitstream syntax"), which indicates that the "sequence header" contains information about "horizontal size", "vertical size", "pixel aspect ratio".

Once the information about the new display format has been stored into the memory 406, it can be recalled later by the user as desired.

In one embodiment, a customised format stored in the memory 406 is recalled automatically as a function of the characteristics of the video stream to be displayed.

In particular, characteristics of the video stream present at the input 407 are compared with reference format parameters stored in the memory 406.

In one embodiment, based on this comparison it is established which setting is best suited to the received video stream. For example, a given TV transmission is always characterised by the same type of bands, and a certain video track stored in a memory medium normally preserves its own original format every time it is played, thus allowing for automatic resizing when the same conditions occur later on.

Let us assume, for example, that the user selected in the past a certain frame portion when a program titled "Flash news" was being broadcast, which program included annoying light orange bands with a changing text that the user did not like and therefore prevented from being displayed in accordance with the method described with reference to FIG. 1. If the function for automatically recalling the display settings is on, the format controller 404 will now detect the program title "Flash news" (from the event table of the transport stream, or from any other program identifier among those mentioned above, for example) and then will activate the appropriate display settings by accessing the memory 406 and retrieving the information required for changing the settings of the video format produced by the processor 405. As a result, the display 402 will play the video stream with the settings desired by the user for the program titled "Flash News" and selected on past occasions by the user him/herself.

In order to improve the reliability of the function for automatically recalling the display settings it is possible, for example, to store and use as a comparison criterion several parameters at the same time, such as the broadcaster name (in fact, TV programs having the same title may be distributed by different broadcasters, e.g. belonging to different countries and received via satellite). These broadcaster may frame the distributed television program with different bands, or some broadcaster may frame the original video content and others may not. Let us think, for example, of a sports program transmitted and broadcast differently (satellite, cable or terrestrial television) by different broadcasters.

Similar considerations apply to video streams coming from other sources, such as an optical or electronic medium or an external reader of stored video streams; the file name or the title and/or chapter of the DVD or Blu-ray film will be read and compared with analogous parameters previously stored for the video content in association with customised resize settings entered by the user.

It is conceivable that the settings are recalled in a fully automatic manner, i.e. that the control of the processing unit 401 implements the above-described process every time the original format of the video stream or the information associated therewith changes. Alternatively, it is conceivable that the settings are automatically recalled upon a user's command indicating that he/she wants to recall any customised settings, e.g. by pressing a specific button or whenever the user changes channels or switches between different video input sources.

According to this automatic recall mode, the operating parameters for selecting the automatic display settings are established by the manufacturer at production level or when the firmware is updated.

A third mode of recalling the display settings may be of the semiautomatic type. This mode is intermediate between the two described above, and advantageously allows to exploit some features of both so as to better adapt the display format to the user's preferences. According to this third semiautomatic mode, the user expresses his/her desire to display the video stream according to a format other than the one currently being applied; this can be done, for example, by pressing a button of the control unit. Following said signalling, the controller 404 detects the characteristic parameters of the video content being displayed as previously described with reference to the automatic recall mode.

In the semiautomatic mode, these characteristic parameters are compared with the corresponding parameters of the customised formats stored in the memory 406, so as to generate a list of preferred display settings sorted in priority order. Preferably, the various formats in the list are sorted according to a priority order defined when the apparatus was manufactured or when the firmware was updated; for example, in one embodiment the priority order depends on the number of matching parameters; alternatively, the priority order may depend on the number of matching parameters as well as on different weights assigned thereto; in yet another embodiment, the list order takes into account the settings most frequently used by the user.

After the list of display formats has been defined, the controller 404 displays the video stream according to the first format in the list, and the result is shown on the display 402. If the user is not satisfied with the recalled format, he/she signals the intention of changing the display format, e.g. by pressing again the format change button through the user interface 408; the format controller 404 then selects the second format in the list and displays the video stream based on this second format. The procedure is repeated until a display format is found which is approved by the user or until the end of the list is reached. In the event that there are no satisfactory display formats, in one embodiment the user is asked by a prompt on the screen to define a new customised display format in accordance with the method described above with reference to FIG. 1. The above-described three modes of recalling the stored formats are not strictly alternative to one another; for example, they may be made available for selection by the user in the same device.

Advantageously and comfortably for the user, it is conceivable that the controller 404 stores the previously active format and display settings so as to continuously monitor the video stream and have the device return to the previously active display mode when the current display mode is no longer necessary, i.e. when, for example, the annoying items have disappeared from the original video stream. For example, if the user selected a certain video stream frame 210' for the program titled "Flash News", then the controller 404 will monitor the persistence of the parameters stored for that program in the video stream (e.g.: program title, broadcasting time, service or broadcaster name, video stream format and resolution, and the like) and, when these parameters or a significant subset thereof change, the display device will automatically apply the image format which was active before the program "Flash News" began or anyway before the display device detected the reception thereof and consequently applied the customised display settings previously programmed by the user. If, for example, the television broadcaster was broadcasting a classical music concert in 16:9, for which the setting named "undeformed full-screen 16:9" was used, at the end of the "Flash News" program the format controller 404 will cause the video display device to return to that display setting which was active prior to its beginning, unless for the program that follows another display setting has been defined in accordance with predetermined criteria.

Likewise, if the user changes television program or the video source to be reproduced on the screen, then the format controller may monitor the presence of said parameters in order to automatically apply the previously programmed customised settings to the video stream portion selected for display, whereas in their absence the image may be displayed in the native format of the video stream or in a default format defined by the user or by the manufacturer, depending on the particular embodiment chosen. For example, let us assume that the user temporarily changes the program number under which the television station broadcasting "Flash News" is stored due, for instance, to an advertising break, thus displaying the program broadcast by the television station named "RAI 2". In such a case, the format controller 404 will apply, if available, the customised display settings already defined for the program broadcast by RAI 2, the visualisation of which has been activated by the user, or it will apply the display settings defined by the user for that specific television program broadcast by RAI 2 or, in the absence thereof, the criterion applicable to a generic video stream originated by RAI 2, whether defined by the user or by the manufacturer, in accordance with one or more of the above-described definition modes. If the user then returns to the television station that is broadcasting the program called "Flash News", then the device will detect the correspondence between the identification parameters contained in or associated with the video stream (e.g. program number, program title, broadcasting time, and so on) and will automatically apply the display settings previously programmed by the user for this program.

Figure 5:
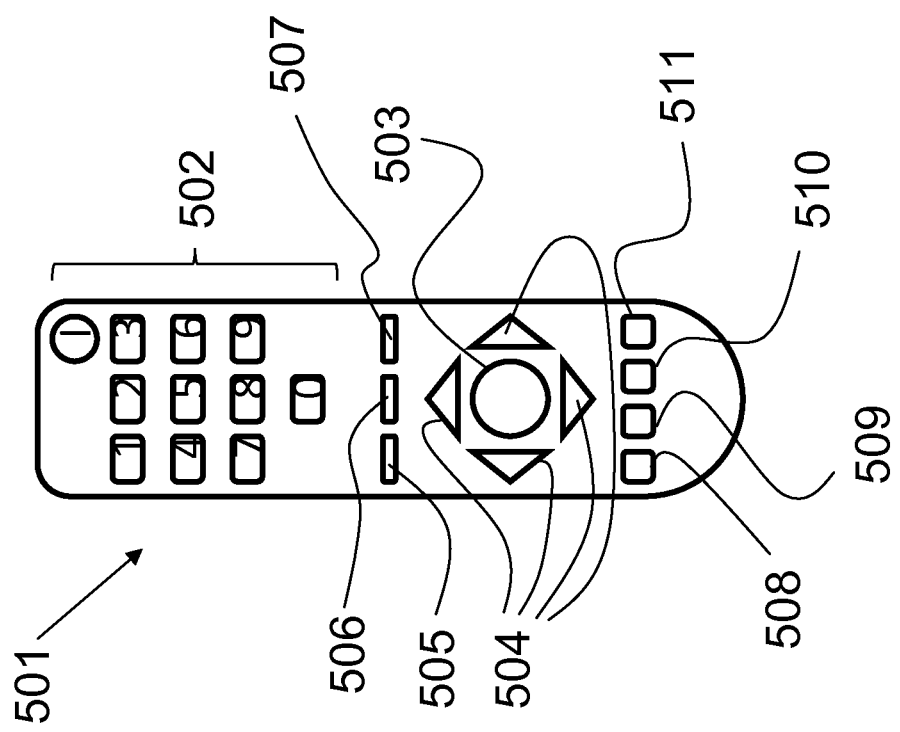
FIG. 5 shows an example of a user interface which may be used in combination with the device of FIG. 4.

FIG. 5 shows an example of a user interface 501 (corresponding to the user interface 408 of FIG. 4) which may be used in combination with a device implementing the present invention. The user interface 501 comprises a remote control of the type usually employed for television or video apparatuses, with a general control portion 502 which allows, among other things, to turn on/off the device and to select the channel or video source. These general controls 502 comprise all those buttons which are necessary for operating the device (not all of them are shown in the drawings for simplicity's sake) according to the teachings of the prior art.

In addition to these buttons or, for simplicity, re-using common buttons already provided on a typical remote control, according to the present invention the user interface 501 also comprises an "OK" acceptance button 503 and four buttons 504 for moving or enlarging the graphic element 210 (with reference to FIG. 2) in all four directions (the "OK" acceptance button and these arrow buttons are already present on most remote controls available on the market).

Moreover, the user interface 501 comprises a button 505 for starting the display format definition procedure and, if these setting recall modes are provided, also a button 506 for the manual recall function and a button 507 for the automatic/semiautomatic recall function.

The user interface 501 further comprises a button 508 for accessing the display format menu, e.g. in order to modify the display format settings stored in a memory area as previously described.

The interface 501 also comprises a button 509 which allows the user to manually select the original video stream format (e.g. 16:9 or 4:3, if this information is not accurately transmitted by the television broadcaster). Finally, the user interface 501 comprises a button 510 which allows the user to abort at any time the display format definition procedure, as explained with reference to step 107 of FIG. 1.

It is conceivable that, during the display format definition procedure, the user is guided by brief control instructions presented sequentially on the screen, indicating the setting options and the buttons to be pressed to make the adjustments. These instructions may, for example, be recalled by pressing a Help button 511 on the control unit.

It is also conceivable that at the end of the display format definition procedure the user assigns an alphanumerical identifier to the display format just defined, so that it can be easily recognised and recalled in the future. This identifier assignment may take place by entering characters through the numeric keypad, just like mobile telephones, or through a virtual keyboard displayed on the screen.

FIG. 6 shows some examples of a graphic element which, in one embodiment, is used in the display format definition procedure described above with reference to FIGS. 1 to 3. Said graphic element is in general displayed on the display 402 and represents the frame area to be selected and expanded to full screen; the graphic element may comprise additional information about the expansion or resize mode or other information such as superimposed text or graphic symbols (coloured arrows, rectangles with dashed sides, etc.).

The first example of a graphic element 601 is a dashed rectangle having suitable colour and thickness, which lies on the screen superimposed on the video stream, so as to be easily visible to the user. For example, when the user wants to change the position of one side of the rectangle 601, he/she will select it by means of the user interface and then the selected side will change its appearance, e.g. by turning into a continuous line or by changing colour. At this point the user can change the position of the side of the graphic element, modifying as a result the shape and dimensions of the whole element. The graphic element may consist of any combination of graphic parts, provided that they allow to define the area to be selected: for example, only the four vertices of the rectangle may be displayed, or they may be represented through two line segments converging in the vertex point, as shown in the element 607. At the very least, it might be sufficient to display only two opposed vertices lying on the same diagonal, or a representation thereof by means of converging line segments.

The second example of a graphic element 602 adds one feature to the preceding examples, i.e. the presence of four right-angled triangles 603 with the vertex opposite the hypotenuse facing outwards, so as to represent a sort of arrow indicating the direction of dimensional expansion. By selecting these triangles, the user can enlarge or reduce the rectangle 602 to enclose a frame portion having variable dimensions without changing the proportions thereof, with the advantage that it is not necessary to individually modify the position of each side. Of course, other graphic elements may be used to indicate such a symmetrical resize operation, possibly accompanied by superimposed instructions in the form of symbols and/or alphanumerical writings.

Finally, the third example of a graphic element 604 includes a central element 605, in this case a cross, which, when selected by the user, allows the centre of the rectangle 604 to be moved in the four directions to select a frame portion, even not centered on the screen. These graphic element examples are not of course strictly alternative to one another, but may be combined together to create additional and more complex graphic elements.

In addition to the above, the following will now describe a few advantageous variations or additions that may be incorporated into the present invention.

It is advantageous to provide the possibility for the user to modify the customised display formats previously stored; for example, the user may recall from a list the settings stored in the apparatus and modify them in an interactive way, by changing their numeric parameters or by executing the interactive graphic procedure described previously.

The format may also be changed offline, i.e. in the absence of the video stream to which the format must be applied: the user defines the selection area on a predetermined sample background, specifying also the parameters relating to the type of video content to which he/she wants to apply that format. Said operating parameters may be displayed on the screen in a menu or a table (program or broadcaster name, program number, file or DVD name, video input, input video stream format, and the like). The user may manually enter said parameters of interest (or even only a subset of all the available parameters) into the menu or table to be filled in; after the data entry has been confirmed, the device will store these parameters by associating them with the customised display format just set, which can then be recalled according to the above-described modes.

In one embodiment, the customised display format definition procedure is inhibited when certain conditions arise, set by the manufacturer: for example, when the original format detected (16:9) and the screen format (16:9) match, or when, for particular reasons defined by the video content producer (e.g. pay TV broadcaster, DVD or Blu-ray film producer), the user is not allowed to alter the size of the video content in order to remove advertising information.

In one advantageous embodiment, when the program number or video input is changed, the name of the currently active format is superimposed on the screen for a few instants. In another embodiment, it is conceivable that the user can recall the settings of a stored display format and modify it in a manner such as to save the modified format as a different format which can then be recalled by the user or by the display device. As an alternative, the user may also recall the parameters of the current display format to change them and then save them as a new customised format. In both cases, the display format definition procedure turns out to be considerably simpler for the user.

It is apparent that many changes may be made to the present invention by those skilled in the art without departing from the protection scope thereof as stated in the appended claims.

For example, the format controller 404 may be implemented as a specific circuit or chip, or its functions may be carried out by the video processor or by the general control unit of the device, typically consisting of a microprogrammable microprocessor supervising the operation of the device. it may be implemented, whether fully or partially, as software or firmware defined at the factory, which can then be updated locally or remotely.

Alternatively, some of its functions may be carried out in a distributed and organised manner by different circuits or modules interacting and cooperating together to implement the method according to the invention. For example, the microprocessor may deal with receiving and interpreting the commands received from the user interface 408, supplying instructions and data to the video processor 405 for generating the frames and graphic elements referred to in the present description and shown in the annexed drawings, and changing the aspect and characteristics thereof depending on the commands entered by the user through the interface 408 during the display area selection step.

The microprocessor may also acquire the parameters associated with or contained in the video stream to be played, whether directly or via the video processor, or through a special module for extracting such parameters (not shown in FIG. 4) comprising, for example, a teletext and/or WSS decoder, a PAL, SECAM or NTSC tuner, a DVB or ATSC demodulator, an MPEG 2 or MPEG 4 decoder. The microprocessor may compare the parameters of the video stream currently being played with those previously stored by it into the memory 406, and may save the parameters associated with new customised formats by acquiring the characteristics thereof (cutout pixel coordinates, desired portion and position on the screen, mode of expansion on the screen, and the like) from the memory 406 where it had previously stored them. It is important to point out that a device incorporating the present invention may not necessarily have a built-in display. In fact, it is sufficient that the device has one video output carrying a signal that can be associated with a screen, the format of which is known and through which one can execute the essential steps that characterise the invention.

For example, the invention may be used in a video recording apparatus as well; if the user programs the recording of the program titled "Flash News" with which he/she associated a certain customised display format, the video recorder may automatically apply such a format, if possible, during the recording process, or else it may store that customised display format and execute the format switching on the output video signal during the reproduction process in accordance with the teachings of the present invention. Similar considerations also apply to television receivers (set top boxes, TV cards for PCs), video recorders or other apparatuses not equipped with a display but capable of generating video signals associable with a display-equipped device where said video signals can be reproduced, provided that such apparatuses have means for acquiring the information about the display device (e.g. plasma monitors, LCDs, CRT or back-projection television sets, video projectors) necessary for implementing the present invention; this information may be obtained, for example, via a bidirectional HDMI or wireless interface, or even manually by the user operating the control interface 408.

Furthermore, due to the ever increasing electronic circuit integration, the functional units described with reference to FIG. 4 (format controller, memory and video processor) may in the future be incorporated into a single integrated circuit performing all the functions described herein, without however departing from the protection scope set out in this patent's claims.

The invention claimed is:

1. A method for displaying a selected portion of a video stream according to a format defined by a user, on a screen having a first aspect ratio,
    the method comprising:
        superimposing a graphic element on the video stream while the video stream is displayed according to a first format;
        selecting a portion of the video stream displayed according to the first format by modifying, as a function of commands received from said user, dimensions and/or position of said graphic element, so as to define a screen area in which a portion of the video stream is displayed and having any second aspect ratio defined by the user, wherein the screen area is inside the graphic element and wherein the portion of the video stream displayed according to the first format inside the graphic element is visible in the screen area defined by the graphic element, and wherein the first aspect ratio of the screen and the second aspect ratio of the selected portion are different from each other;
        changing the first format of the portion of the video stream, wherein said selected portion is displayed in the second format; and
        only displaying said selected portion of the video stream in the second format, wherein for each frame of said video stream, a frame portion associated with the defined screen area is displayed in the second format expanded on the screen and wherein the selected portion is enlarged to match at least one of the dimensions of any one side of the selected portion with a dimension of a corresponding side of the screen, while preserving the aspect ratio of said selected portion of the frame.

2. A method according to claim 1, wherein said frame portion defined by said graphic element is displayed expanded in a manner such that only one dimension of said frame portion corresponds in said second format to a dimension of said screen, while preserving an aspect ratio of said frame portion.

3. A method according to claim 2, wherein said frame portion is automatically centered on said screen prior to being displayed.

4. A method according to claim 1, wherein said frame portion defined by said graphic element is displayed in a manner such that both dimensions of said frame portion correspond in said second format to dimensions of said screen.

5. A method according to claim 2, wherein the user can further change the position on said screen of said frame portion displayed in expanded form on said screen can be changed.

6. A method according to claim 1, wherein at least one area of said frame portion defined by said graphic element is further cut, and the remaining uncut frame portion is displayed in a manner such that a minor dimension of said uncut frame portion corresponds in said second format to a dimension of said screen.

7. A method according to claim 1, wherein said steps are carried out after the user issues a signal for resizing said video stream on said screen, and wherein said first format is automatically selected in a manner such as to make the entire content of the frames of said video stream visible on said screen.

8. A method according to claim 7, wherein said steps are interrupted upon a user's command, and after said interruption said video stream is displayed on the screen in the same display format which was active prior to said user's signal.

9. A method according to claim 1, wherein said graphic elements define a rectangle.

10. A method according to claim 9, wherein the sides of said rectangle can be translated upon the user's command.

11. A method according to claim 1, wherein display settings associated with said second display format are stored in a memory, said settings comprising, in particular, information about the dimensions of the frame portion to be displayed.

12. A method according to claim 11, wherein said settings can be recalled by selecting a name from a list.

13. A method according to claim 12, wherein said settings can be recalled by selecting a frozen frame of any image that constitutes the video stream.

14. A method according to claim 11, wherein said settings are recalled automatically as a function of information carried by said video stream.

15. A method according to claim 14, wherein said information carried by said video stream is chosen from an information group including: original format of said video stream; television channel broadcasting said video stream; title of the DVD or Blu-ray disc or name of the file being played; television broadcaster name or identifier; TV program title; TV program type; TV program broadcasting date and time.

16. A method according to claim 11, wherein the user defines a plurality of display formats, wherein the settings concerning said plurality of display formats are stored into a memory area, and wherein said method for displaying said images comprises the step of recalling one format of said plurality of stored formats as a function of information carried by said video stream.

17. A method according to claim 11, wherein said settings are recalled automatically as a function of the video source from which said video stream is being received, in particular as a function of the video input from which the displayed video stream is coming.

18. A method according to claim 1, further comprising a procedure for modifying a display format defined by said user and stored in a memory area, said procedure comprising the steps of:
    displaying said video stream in a format that allows the entire content of the frames of said video stream to be displayed on said screen,
    displaying said graphic element with a shape and in a position which correspond to the frame portion to be displayed according to said stored format,
    modifying the shape and/or position of said graphic element as a function of commands received from said user,
    storing in a memory information necessary for displaying said video stream according to a third format wherein, for each frame of said stream, the frame portion defined by said modified graphic element is displayed expanded on the screen.

19. A device for displaying a video stream, comprising means adapted to implement the method according to claim 1.

\* \* \* \* \*